US009945116B2

(12) United States Patent
Tsai

(10) Patent No.: US 9,945,116 B2
(45) Date of Patent: Apr. 17, 2018

(54) FRICTION-DAMPING ENERGY ABSORBER

(71) Applicant: Chong-Shien Tsai, Taichung (TW)

(72) Inventor: Chong-Shien Tsai, Taichung (TW)

( * ) Notice: Subject to any disclaimer, the term of this patent is extended or adjusted under 35 U.S.C. 154(b) by 0 days.

(21) Appl. No.: 14/961,532

(22) Filed: Dec. 7, 2015

(65) Prior Publication Data

US 2017/0159287 A1    Jun. 8, 2017

(51) Int. Cl.
*E04B 1/98* (2006.01)
*F16F 7/08* (2006.01)

(52) U.S. Cl.
CPC ........... *E04B 1/98* (2013.01); *F16F 7/087* (2013.01); *F16F 2222/04* (2013.01); *F16F 2232/08* (2013.01); *F16F 2236/103* (2013.01)

(58) Field of Classification Search
CPC .......... F16F 7/08; F16F 7/087; F16F 2222/04; F16F 2232/08; F16F 2236/103; E04B 1/98; E04H 9/021; E04H 9/022; B60G 13/02; B60G 13/04; B60G 2202/23
USPC ............... 267/140.3, 140.4, 140.11, 141.1; 52/167.4, 167.7, 167.8; 248/569, 570; 188/372, 381
See application file for complete search history.

(56) References Cited

U.S. PATENT DOCUMENTS

| | | | | | |
|---|---|---|---|---|---|
| 3,349,418 A | * | 10/1967 | Hein | ..................... | E01D 19/041 14/73.5 |
| 4,593,502 A | * | 6/1986 | Buckle | ..................... | E04B 1/98 52/167.7 |
| 4,633,628 A | * | 1/1987 | Mostaghel | ............. | E02D 27/34 52/167.7 |
| 4,713,917 A | * | 12/1987 | Buckle | .................. | E01D 19/041 248/565 |
| 4,899,323 A | * | 2/1990 | Fukahori | .................... | E04B 1/36 248/560 |
| 5,233,800 A | * | 8/1993 | Sasaki | ..................... | E04H 9/022 52/167.1 |
| 5,452,548 A | * | 9/1995 | Kwon | ................... | E01D 19/041 248/567 |
| 5,655,756 A | | 8/1997 | Robinson | | |
| 5,765,322 A | * | 6/1998 | Kubo | ...................... | E04H 9/022 248/634 |
| 7,856,766 B2 | * | 12/2010 | Takenoshita | ........... | E04H 9/022 248/636 |
| 9,085,896 B2 | * | 7/2015 | Tsai | .......................... | E04B 1/98 |
| 9,617,730 B1 | * | 4/2017 | Tsai | .......................... | E04B 1/98 |

(Continued)

FOREIGN PATENT DOCUMENTS

EP    0341058 A1 * 11/1989    ............. E04H 9/022
JP    02088834 A  *  3/1990

(Continued)

*Primary Examiner* — Thomas J Williams
(74) *Attorney, Agent, or Firm* — C. G. Mersereau; Nikolai & Mersereau, P.A.

(57) ABSTRACT

A friction-damping energy absorber has at least one sliding post, a sliding sleeve, and two supporting boards. The at least one sliding post has two ends. Each one of the at least one sliding post is composed of multiple first material layers and multiple second material layers arranged in an alternate manner mounted. The sliding sleeve is mounted around at least one part of the at least one sliding post and is composed of at least one sliding unit. The supporting boards are respectively mounted on two ends of the at least one sliding post.

46 Claims, 31 Drawing Sheets

(56) References Cited

U.S. PATENT DOCUMENTS 9,771,997 B2 * 9/2017 Tsai .......................... F16F 1/40
2008/0222975 A1 * 9/2008 Nakata .................... E04H 9/022
 52/167.9

FOREIGN PATENT DOCUMENTS

JP   02248551 A  * 10/1990
WO   WO 0031436 A1 *  6/2000   ............. E04H 9/022

* cited by examiner

FRICTION-DAMPING ENERGY ABSORBER

BACKGROUND OF THE INVENTION

1. Field of the Invention

The present invention relates to an energy absorber, and more particularly to a friction-damping energy absorber; the stiffness, the damping effect and the deformation of the friction-damping energy absorber can be controlled to provide an automatic adjustment function and adaptive characteristics to separately achieve optimum functions for multiple performance objects at multiple levels of vibrations.

2. Description of Related Art

Conventional energy absorbers are commonly mounted on large objects, such as buildings, bridges or machines to provide shock-absorbing and shock-suppressing effects to the objects and to absorb the energy and shocks generated during earthquakes. U.S. Pat. No. 5,655,756 (hereinafter referred to as the referenced case) discloses a conventional energy absorber (Lead Rubber Bearing, LRB) comprises a core post, two supporting boards, multiple metal layers, and multiple rubber layers. The supporting boards are mounted respectively on two ends of the core post, and are securely connected to the ground and a large object respectively. The metal layers and the rubber layers are alternately mounted between the supporting boards. When an earthquake occurs, a shock-absorbing effect can be provided by the deformations of the metal and the rubber layers to reduce the damage caused by the earthquake.

However, the core post of the conventional energy absorber of the referenced case is made of lead. The lead core post may be deformed during the earthquake to absorb the vibration energy of the earthquake, and the deformation of the lead core post will generate heat. Therefore, the temperature of the lead core post of the referenced case will rise to about 350° C., which exceeds the melting point of lead, about 327° C., by the repeated deformation during the earthquake, and the high temperature easily causes the melting of the lead core post, and lead is a toxic heavy metal that will impact the environment. Furthermore, the rubber layers and the lead core post of the conventional energy absorber are easily damaged in the overheating event. In addition, the high temperature also easily decreases the structural strength of the energy absorber, such that the shock-absorbing effect of the conventional energy absorber is also reduced. In addition, even if the temperature does not reach the melting point of lead, the materials (including lead and rubber) are also softened by the temperature, and this will reduce the structural strength and the shock-suppressing and shock-absorbing effects of the conventional energy absorber.

In view of the above-mentioned problems and shortcomings of the conventional energy absorber, the energy absorber that is made of lead has gradually been banned or renounced from use. It is that the world has tried thinking about other shock-absorbing materials or energy absorption mechanism by which it needs to solve the energy absorption, the environmental protection, and other issues. One of the solutions is to remove the lead core post, but the shock-absorbing effect is inadequate and this will cause the energy absorber to have too large displacement. If the conventional energy absorber is used with other dampers such as a hydraulic damper, the cost is expensive. In addition, it is not only cost-ineffective, but also requires a large space to accommodate the conventional energy absorber and the other dampers, and this will cause problems of use and needs to be improved.

To overcome the shortcomings, the present invention tends to provide a friction-damping energy absorber to mitigate or obviate the aforementioned problems.

SUMMARY OF THE INVENTION

The main objective of the invention is to provide a friction-damping energy absorber that can improve the stiffness and the damping effect of the energy absorber and provides a fail-safe mechanism and an automatic adjustment function to separately achieve optimum functions for multiple performance objects at multiple levels of vibrations.

The friction-damping energy absorber has two ends, at least one sliding post, a sliding sleeve, and two supporting boards. The at least one sliding post has two ends. Each one of the at least one sliding post is composed of multiple first material layers and multiple second material layers arranged in an alternate manner mounted. The sliding sleeve is mounted around at least one part of the at least one sliding post and is composed of at least one sliding unit. The supporting boards are disposed on the two ends of the friction-damping energy absorber.

Other objects, advantages and novel features of the invention will become more apparent from the following detailed description when taken in conjunction with the accompanying drawings.

DETAILED DESCRIPTION OF PREFERRED EMBODIMENT

Figure 1:
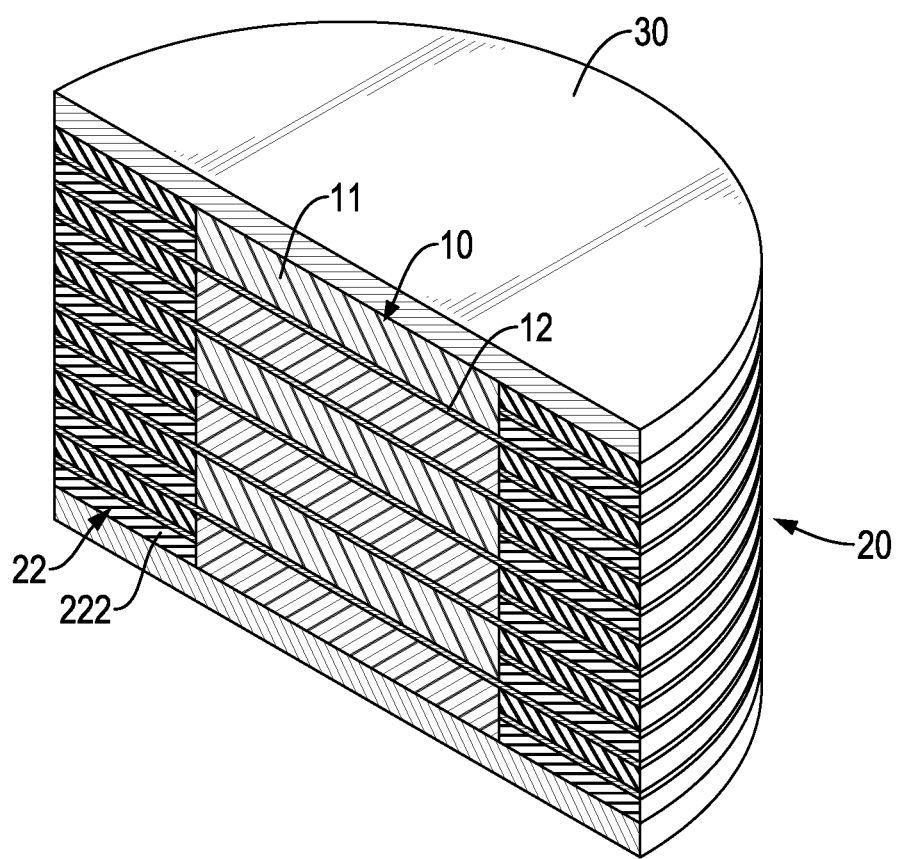
FIG. 1 is a cross sectional perspective view of a first embodiment of a friction-damping energy absorber in accordance with the present invention.
Figure 2:
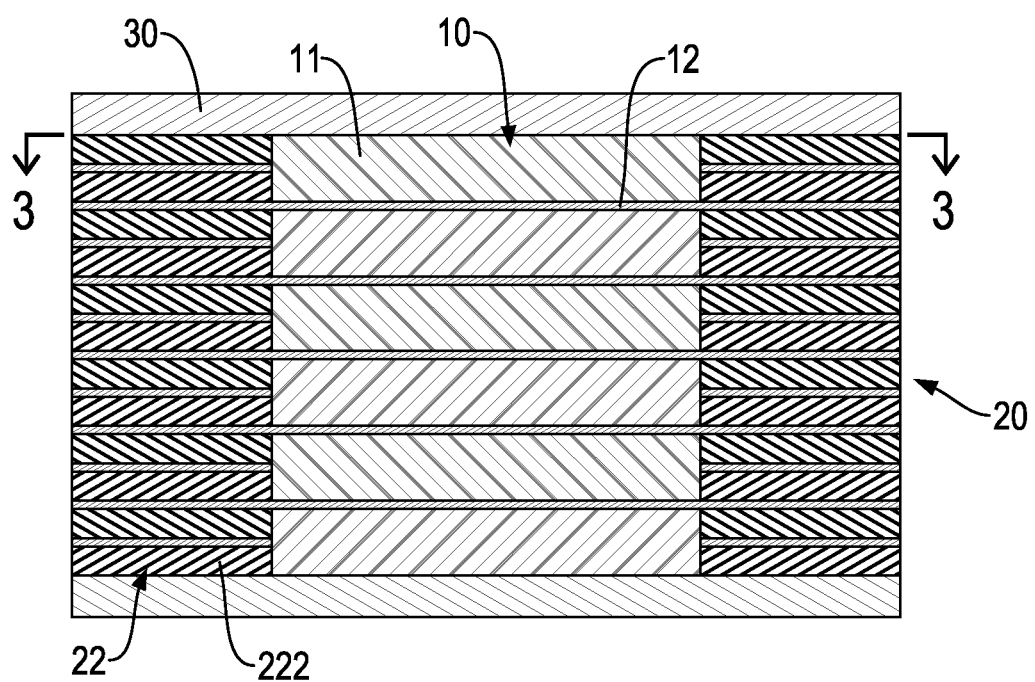
FIG. 2 is a cross sectional front view of the friction-damping energy absorber in FIG. 1.
Figure 3:
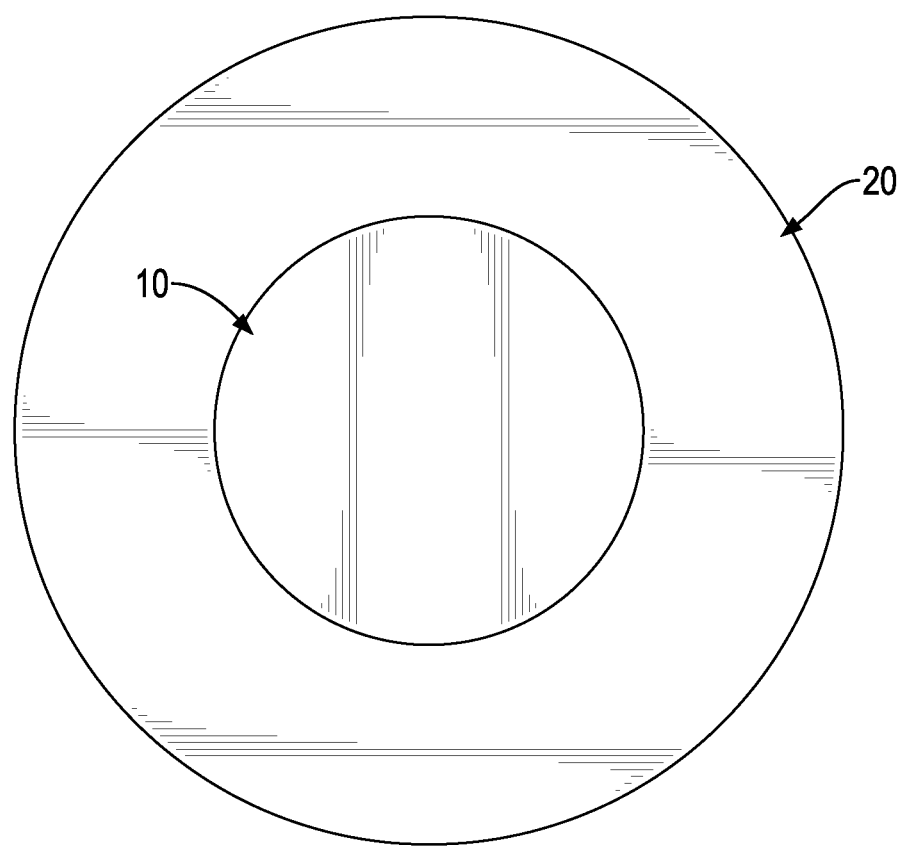
FIG. 3 is a cross sectional top view of the friction-damping energy absorber along the line 3-3 in FIG. 2.

With reference to FIGS. 1 to 3, a first embodiment of a friction-damping energy absorber in accordance with the present invention is used on buildings, bridges, other large objects, facilities or equipments, and the friction-damping energy absorber comprises at least one sliding post 10, a sliding sleeve 20, and two supporting boards 30.

Each sliding post 10 has a cross section that may be round, rectangular, square or in other geometric shapes. Each sliding post 10 is composed of multiple first material layers 11 and multiple second material layers 12 arranged in an alternate manner. Each one of the first material layers 11 and the second material layers 12 has a shape corresponding to that of the sliding post 10 and may be round, rectangular, square or in any possible shape. The first material layers 11 and the second material layers 12 are made of flexible materials that are different from each other. Preferably, the first material layers 11 may be made of rubber, metal or composite materials. The second material layers 12 may be made of metal, rubber or composite materials.

The sliding sleeve 20 is mounted around at least one part of the at least one sliding post 10 and is composed of at least one sliding unit 22. In the first embodiment, the sliding sleeve 20 is mounted around a whole length of the at least one sliding post 10. Each sliding unit 22 may be composed of multiple sliding sheets 222. In the first embodiment, each sliding unit 22 is composed of three sliding sheets 222. Each sliding unit 22 of the sliding sleeve 20 is mounted between two adjacent second material layers 12. The sliding sheets 222 may be made of the same or different hard materials such as iron, aluminum, copper or other metals, or are made of soft materials such as rubber, Polyoxymethylene (POM), Polyether Ether Ketone (PEEK), and Polymeric Materials. Preferably, the sliding sheets 222 are arranged in a stacked manner and are made of hard and soft materials. The sliding sheets 222 of each sliding unit 22 have a same thickness or different thicknesses. Preferably, each sliding sheet 222 can be made of a material with a high friction coefficient or has a sliding layer, such as Teflon (Polytetrafluoroethene) coated on a top side, a bottom side, or an outer surface of the sliding sheet 222.

The two supporting boards 30 are respectively connected to the ends of the at least one sliding post 10, are parallel with each other at an interval, and each one of the supporting boards 30 may be round, rectangular, square or in any possible shapes. The two supporting boards 30 are respectively connected to the ground or a floor and a large object, such as a building, a bridge or a machine by bolts, rivets, or a welding process.

Figure 4:
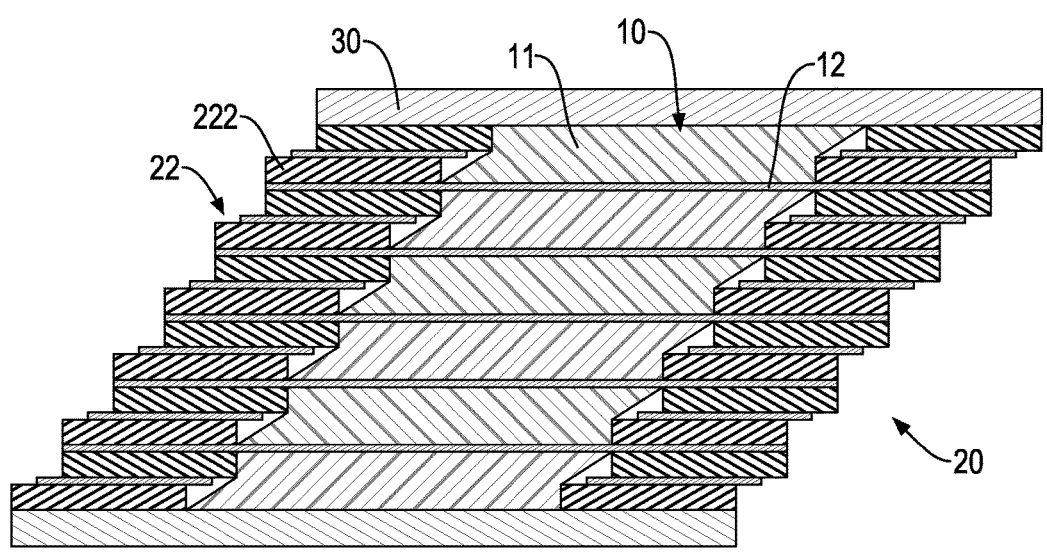
FIG. 4 is an operational cross sectional front view of the friction-damping energy absorber in FIG. 1.

Accordingly, with reference to FIG. 4, the two supporting boards 30 are respectively connected to the ground or a floor and an object, the earthquake shock and energy can be efficiently absorbed and suppressed by the relative slides and friction between the sliding sheets 222 of the sliding units 22 of the sliding sleeve 20 and the deformation of the first and second material layers 11, 12 of the sliding post 10. The three-directional earthquake shock and energy can be kept from being transmitted to the object. Thus, an excellent shock-absorbing effect is provided to the object such as the buildings, bridges, facilities, or equipments to prevent the object from being damaged by earthquakes.

Because the first and second material layers 11, 12 of the sliding post 10 and the sliding sheets 222 of the sliding sleeve 20 are made of non-lead material, the temperature rise induced by the heat that is generated by the repeated deformation can be prevented from impairing the function of the sliding post 10 and the sliding sleeve 20 or even melting the sliding post 10 or the sliding sleeve 20 to produce a significant impact and pollution to the environment. In addition, the friction-damping energy absorber in accordance with the present invention can provide a sufficient damping effect to the object without connecting with other dampers such as a hydraulic damper in use. Then, the cost of using the friction-damping energy absorber can be greatly reduced, and this is cost-effective, and it does not require additional space to install other dampers and this is convenient in use. In addition, the ratio of the vertical stiffness of the sliding sheets 222 and the vertical stiffness of the first and second material layers 11, 12 can be changed to adjust the distribution of the vertical load of the friction-damping energy absorber, such that the friction and the damping effect of the sliding sheets 222 can be also adjusted. Furthermore, with using the sliding sheets 222 having different friction coefficients, the sliding sheets 222 can move relative to each other in different friction conditions and at different times. Accordingly, the damping effect and the stiffness of the friction-damping energy absorber can be automatically adjusted, and the shock-absorbing effect of the friction-damping energy absorber can be improved.

Figure 5:
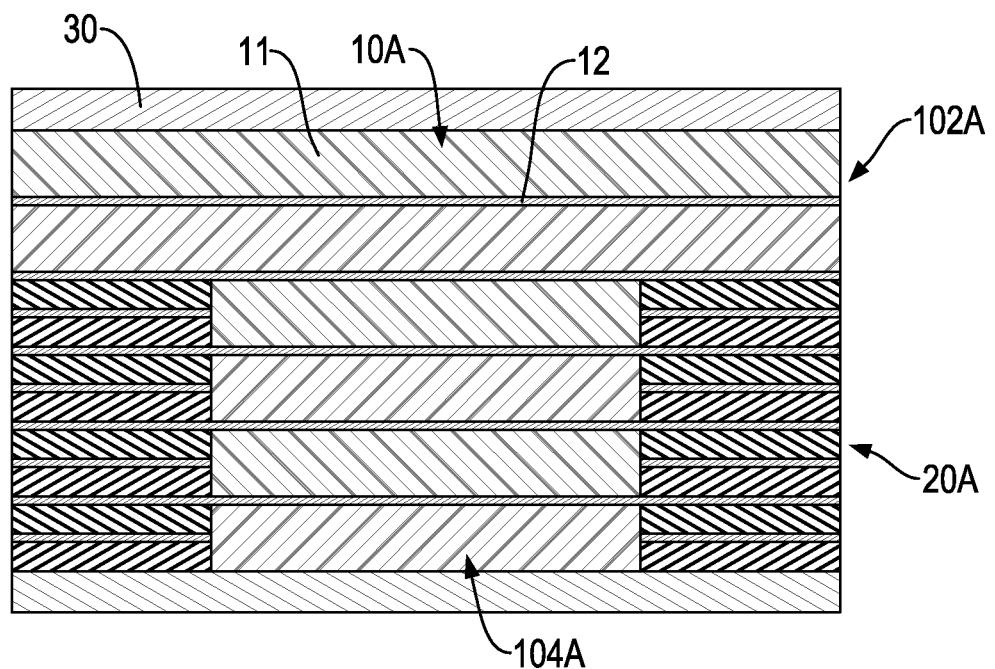
FIG. 5 is a cross sectional front view of a second embodiment of a friction-damping energy absorber in accordance with the present invention.
Figure 6:
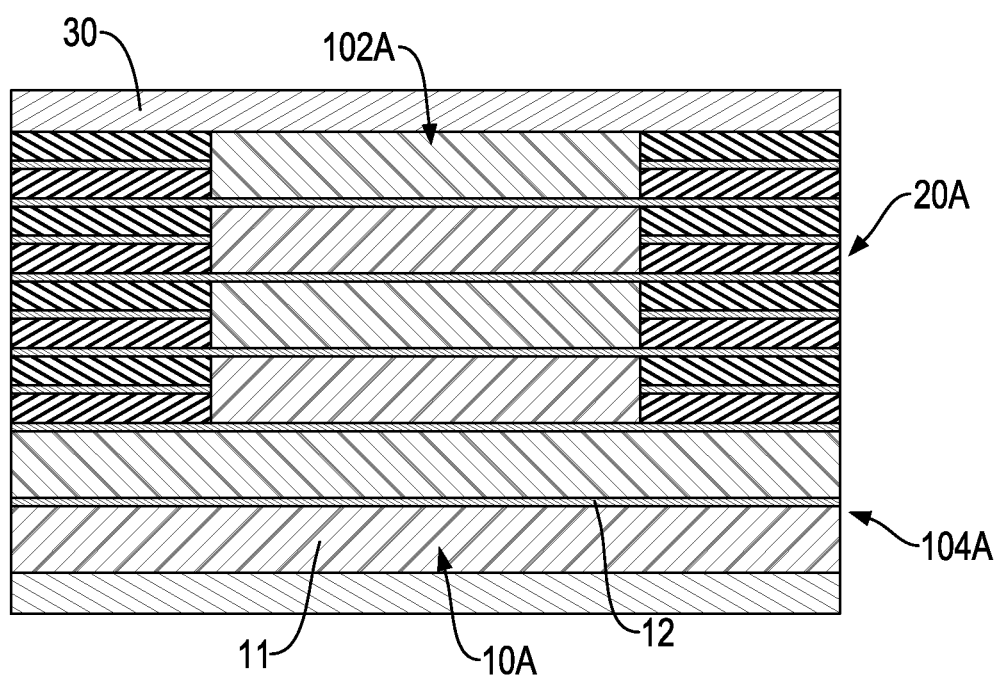
FIG. 6 is a cross sectional front view of a third embodiment of a friction-damping energy absorber n accordance with the present invention.

With reference to FIG. 5, in the second embodiment, the sliding sleeve 20A has a length shorter than a length of the sliding post 10A and is mounted around a lower part 104A of the at least one sliding post 10A. The at least one sliding post 10A has an upper part 102A that is free from being mounted around the sliding sleeve 20A and has a section area larger than a section area of the lower part 104A of the at least one sliding post 10A. The upper part 102A of the at least one sliding post 10A covers over the sliding sleeve 20A. Alternatively, with reference to FIG. 6, the sliding sleeve 20A is mounted around an upper part 102A of the at least one sliding post 10A. The at least one sliding post 10A has a lower part 104A that is free from being mounted around the sliding sleeve 20A and has a section area larger than a section area of the upper part 102A of the at least one sliding post 10A. The lower part 104A of the at least one sliding post 10A extends over the sliding sleeve 20A.

Figure 7:
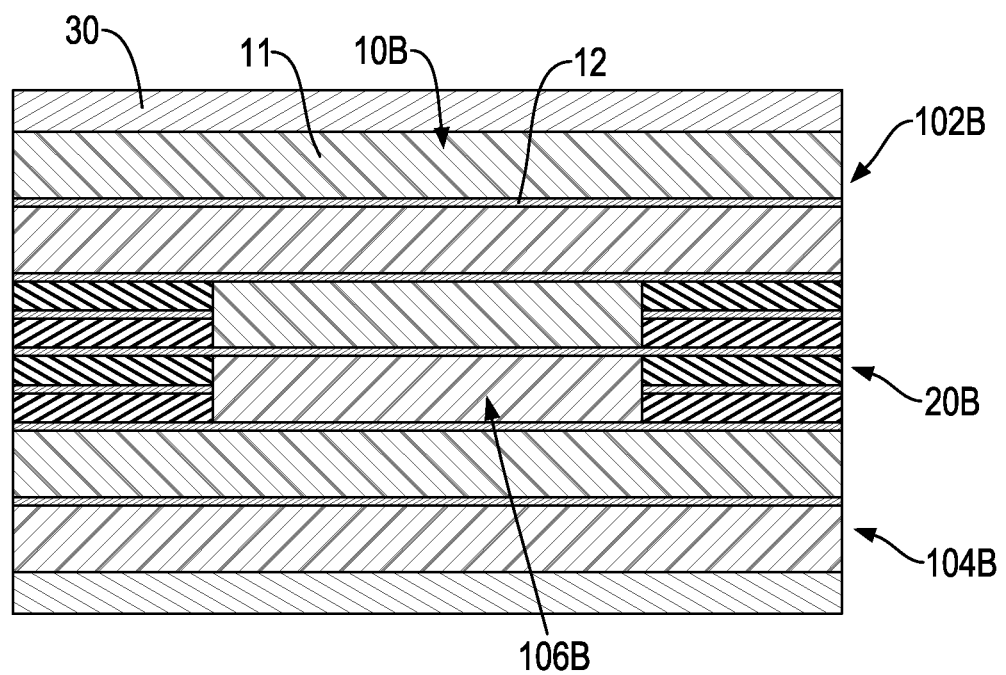
FIG. 7 is a cross sectional front view of a fourth embodiment of a friction-damping energy absorber in accordance with the present invention.

With reference to FIG. 7, in the fourth embodiment, the sliding sleeve 20B has a length shorter than a length of the at least one sliding post 10B and is mounted around a middle part 106B of the at least one sliding post 10B. The at least one sliding post 10B has an upper part 102B and a lower part 104B that are free from being mounted around the sliding sleeve 20B and respectively have a section area larger than a section area of the middle part 106B of the at least one sliding post 10B. The upper part 102B of the at least one sliding post 10B covers over the sliding sleeve 20B, and the lower part 104B of the at least one sliding post 10B extends over the sliding sleeve 20B.

Figure 8:
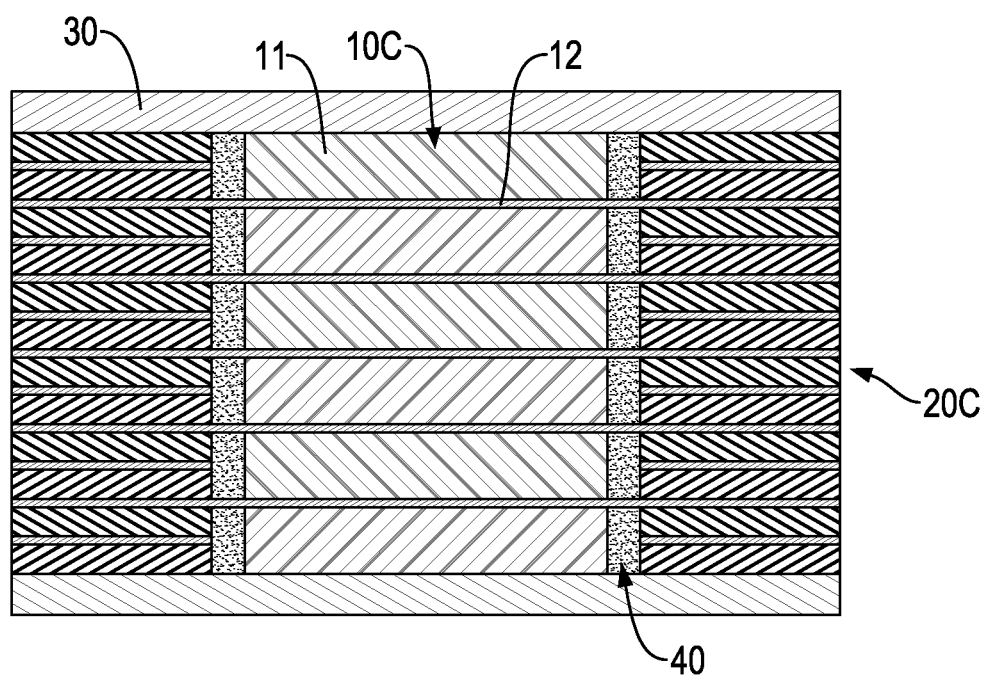
FIG. 8 is a cross sectional front view of a fifth embodiment of a friction-damping energy absorber in accordance with the present invention.

With reference to FIG. 8, in the fifth embodiment, a cooling unit 40 is mounted between the at least one sliding post 10C and the sliding sleeve 20C. The cooling unit 40 comprises a sealed tube and coolant filled in the sealed tube. The sealed tube is hollow and is mounted around the at least one sliding post 10C. The coolant may be gas, liquid or a solid cooling agent. Accordingly, the temperature of the at least one sliding post 10C and the whole friction-damping energy absorber can be effectively reduced to prevent the first and second material layers 11,12 of the at least one sliding post 10C and the sliding sleeve 20C from being damaged or melted due to high temperature. Consequently, the structural strength and the energy absorbing effect of the friction-damping energy absorber can be enhanced.

Figure 9:
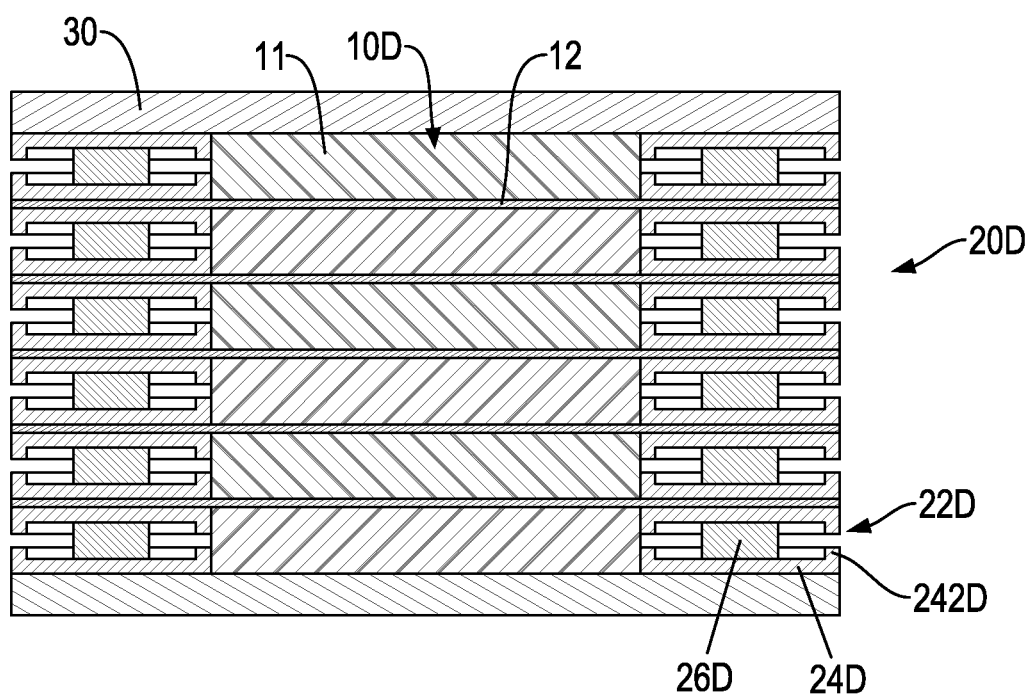
FIG. 9 is a cross sectional front view of a sixth embodiment of a friction-damping energy absorber in accordance with the present invention.
Figure 10:
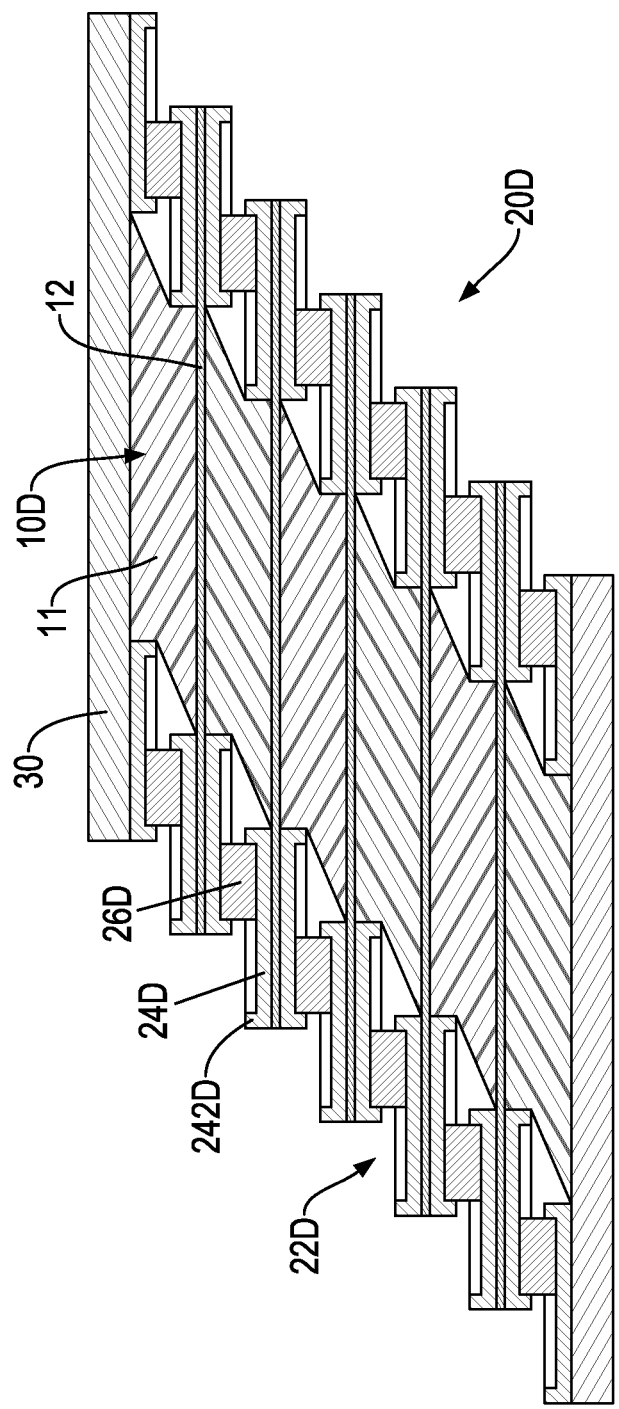
FIG. 10 is an operational cross sectional front view of the friction-damping energy absorber in FIG. 9.

With reference to FIGS. 9 and 10, in the sixth embodiment, at least one of the at least one sliding unit 22D of the sliding sleeve 20D is a sliding assembly. In the sixth embodiment as shown in FIG. 9, all of the sliding units 22D are sliding assemblies. Each sliding unit 22D of the sliding sleeve 20D is mounted between two adjacent second material layers 12 or between one of the second material layers 12 and one of the supporting boards 30. Each sliding assembly comprises two sliding covers 24D and a sliding block 26D slidably mounted between the two sliding covers 24D. The sliding block 26D is slidable relative to the two sliding covers 24D respectively. Each sliding cover 24D has a limiting flange 242D formed on the sliding cover 24D at a side facing the sliding block 26D and mounted around the sliding block 26D. The sliding covers 24D and the sliding block 26D may be round in section. The limiting flange 242D on each sliding cover 24D is annular to limit the sliding range of the sliding block 26D relative to the sliding cover 24D.

With reference to FIG. 10, with the limiting flanges 242D on the sliding covers 24D, when a large earthquake occurs, the sliding range of the sliding block 26D can be limited by the abutment between the sliding block 26D and the limiting flanges 242D on the sliding covers 24D. Accordingly, over deformations of the first material layers 11 and the second material layers 12 can be prevented, and the temperature of the friction-damping energy absorber can be kept from rising highly. Thus, the friction-damping energy absorber can be prevented from being damaged, and the horizontal stiffness and damping effect of the friction-damping energy absorber can be improved. A fail-safe mechanism can be provided, and the energy absorbing and dissipating effect of the friction-damping energy absorber can be enhanced.

Figure 11:
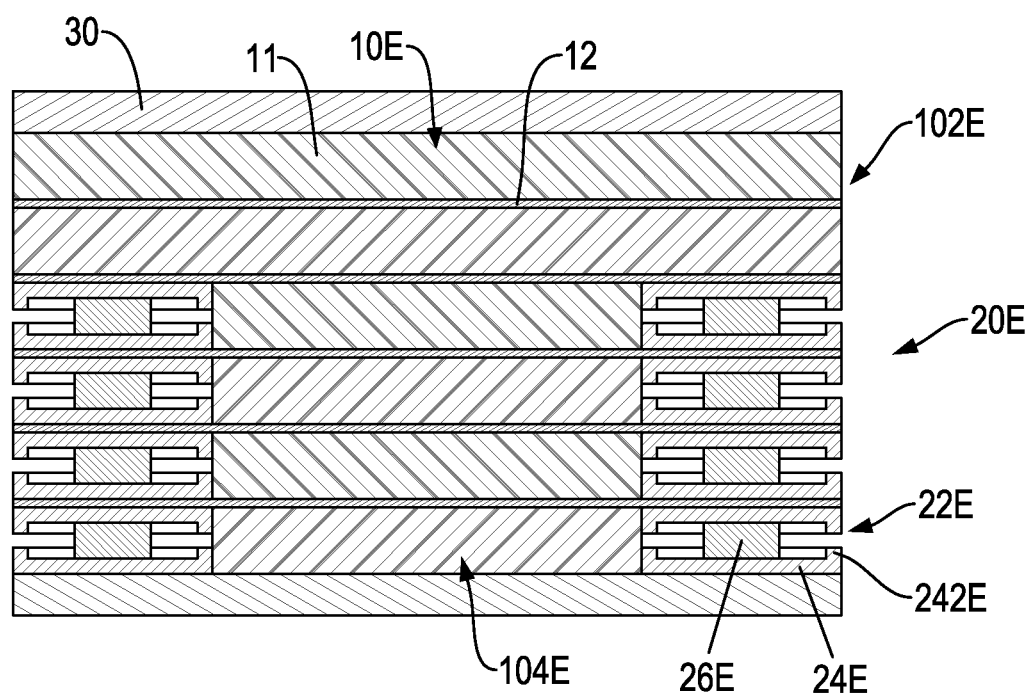
FIG. 11 is a cross sectional front view of a seventh embodiment of a friction-damping energy absorber in accordance with the present invention.
Figure 12:
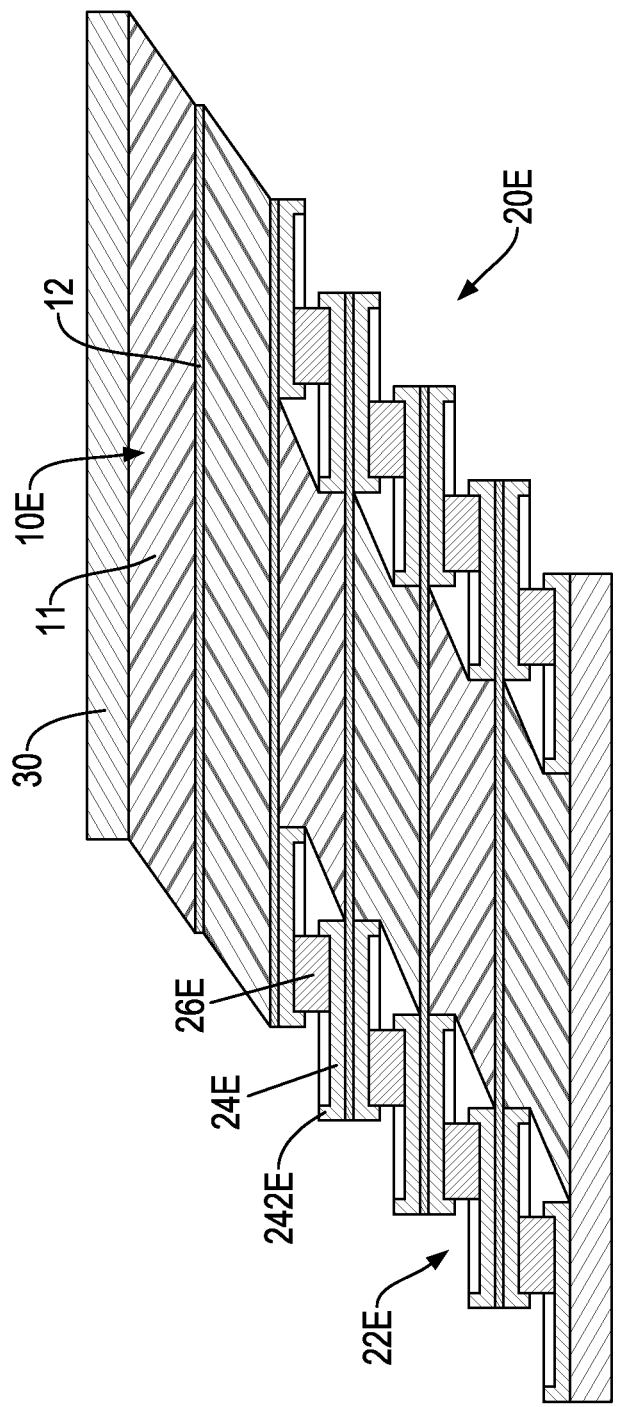
FIG. 12 is an operational cross sectional front view of the friction-damping energy absorber in FIG. 11.

With reference to FIGS. 11 and 12, in the seventh embodiment, the sliding sleeve 20E has a length shorter than a length of the at least one sliding post 10E and is mounted around a lower part 104E of the at least one sliding post 10E. The at least one sliding post 10E has an upper part 102E that is free from being mounted around the sliding sleeve 20E and has a section area larger than a section area of the lower part 104E of the at least one sliding post 10E. The upper part 102E of the at least one sliding post 10E covers over the sliding sleeve 20E. All of the sliding units 22E of the sliding sleeve 20E are sliding assemblies. With the abutment between the sliding block 26E and the limiting flanges 242E on the sliding covers 24E, the sliding range of the sliding block 26E can be limited to prevent the sliding post 10E from being overly deformed and to keep the temperature of the friction-damping energy absorber from increasing. Alternatively, the sliding sleeve 20E may be mounted around an upper part 102E of the at least one sliding post 10E.

Figure 13:
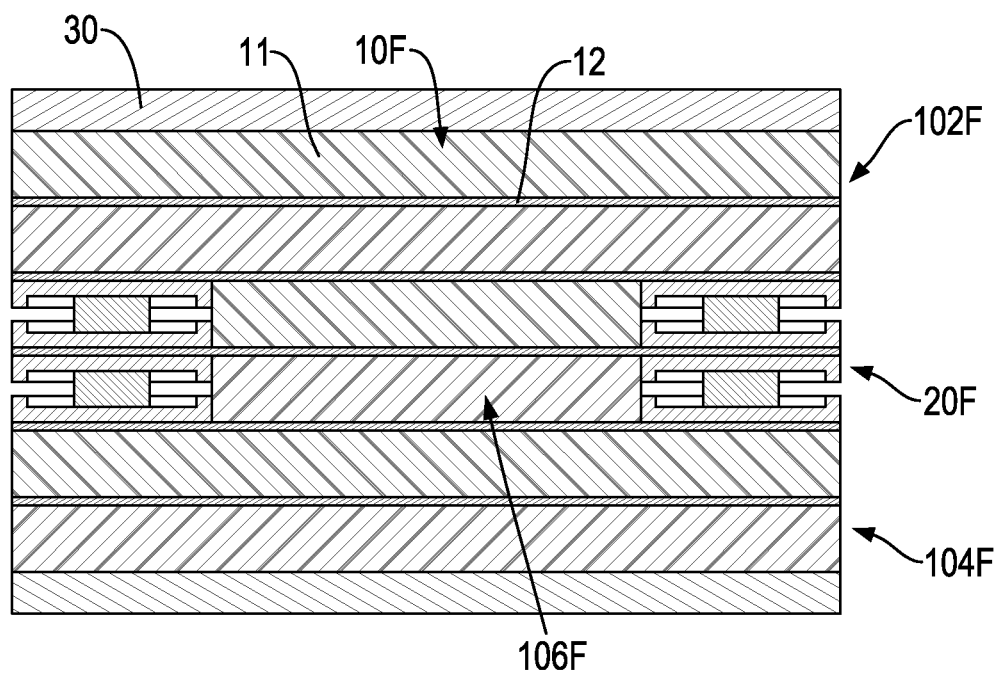
FIG. 13 is a cross sectional front view of an eighth embodiment of a friction-damping energy absorber in accordance with the present invention.

With reference to FIG. 13, in the eighth embodiment, the sliding sleeve 20F has a length shorter than a length of the at least one sliding post 10F and is mounted around a middle part 106F of the at least one sliding post 10F. The at least one sliding post 10F has an upper part 102F and a lower part 104F that are free from being mounted around the sliding sleeve 20F and respectively have a section area larger than a section area of the middle part 106F of the at least one sliding post 10F. The upper part 102F of the at least one sliding post 10F covers over the sliding sleeve 20F, and the lower part 104F of the at least one sliding post 10F extends over the sliding sleeve 20F. In the eighth embodiment, each of two sliding units 22F of the sliding sleeve 20F is mounted between two adjacent second material layers 12.

Figure 14:
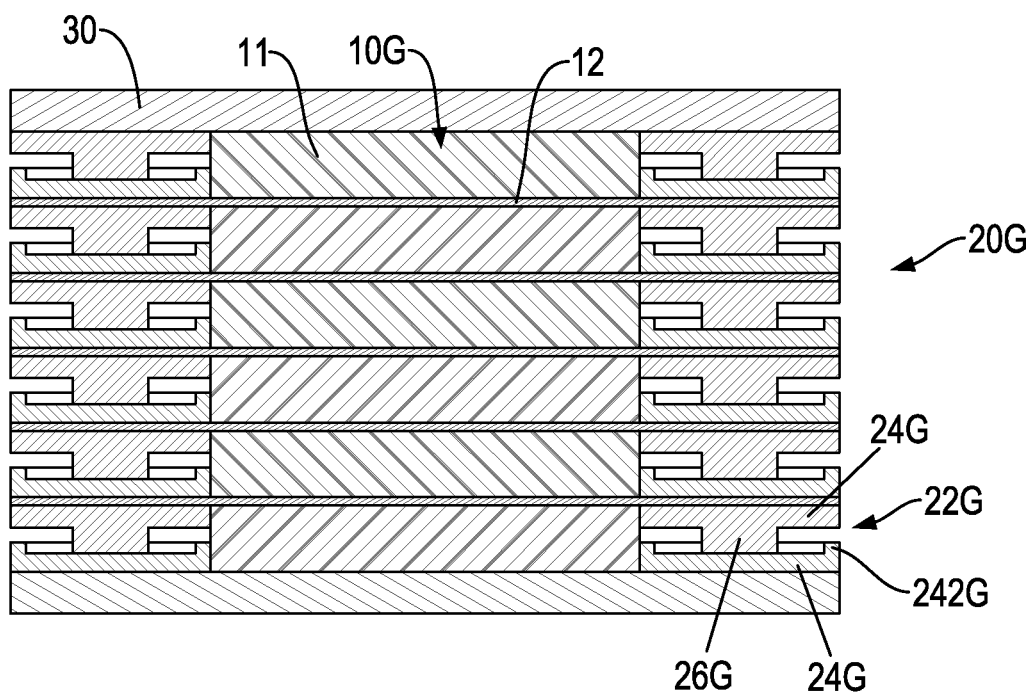
FIG. 14 is a cross sectional front view of a ninth embodiment of a friction-damping energy absorber in accordance with the present invention.
Figure 15:
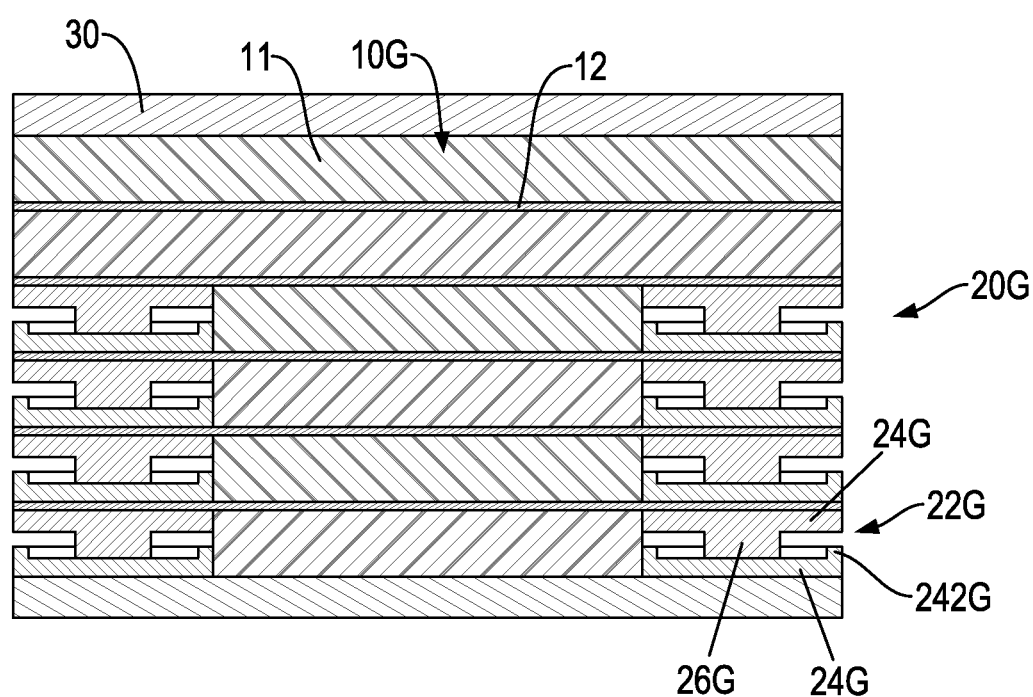
FIG. 15 is a cross sectional front view of a tenth embodiment of a friction-damping energy absorber in accordance with the present invention.
Figure 16:
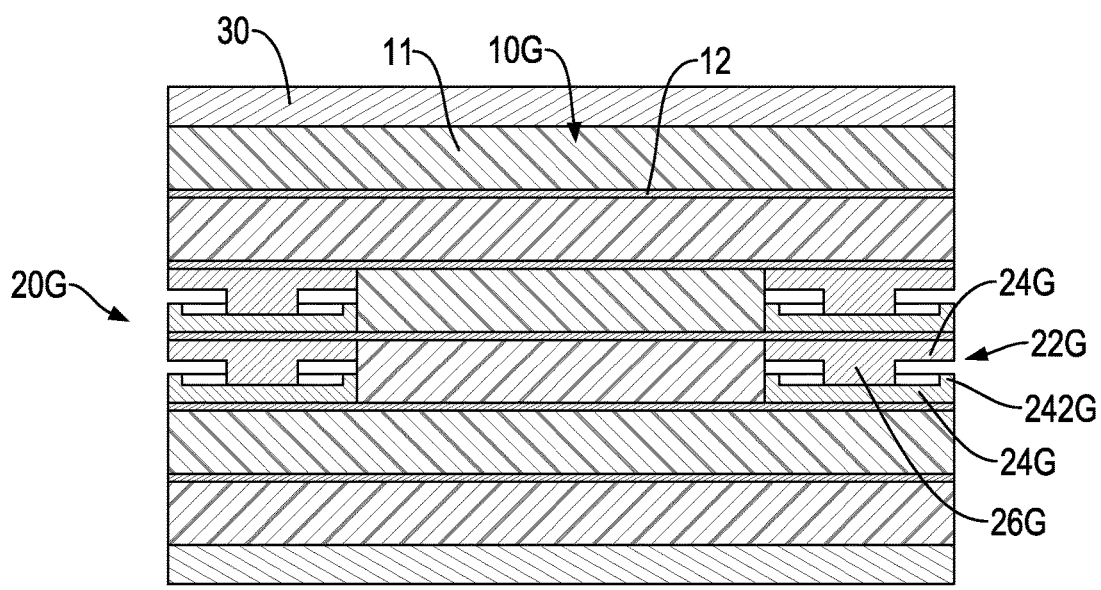
FIG. 16 is a cross sectional front view of an eleventh embodiment of a friction-damping energy absorber in accordance with the present invention.

With reference to FIGS. 14 to 16, in the ninth to eleventh embodiments, at least one of the at least one sliding unit 22G of the sliding sleeve 20G is a sliding assembly. Each sliding assembly comprises two sliding covers 24G and a sliding block 26G mounted between the two sliding covers 24G. The sliding block 26G is integrally formed with one of the sliding covers 24G, and is slidable relative to the other sliding cover 24G. The sliding cover 24G that is slidable relative to the sliding block 26G has a limiting flange 242G formed on the sliding cover 24G at a side facing the sliding block 26G and mounted around the sliding block 26G to limit the sliding range of the sliding block 26G. In the eleventh embodiment as shown in FIG. 16, each of two sliding units 22G of the sliding sleeve 20G is mounted between two adjacent second material layers 12. Alternative, the positions of the sliding block 26G and the sliding covers 24G can be changed to be upside down, the function in the alternative embodiment is same as that of this embodiment.

Figure 17:
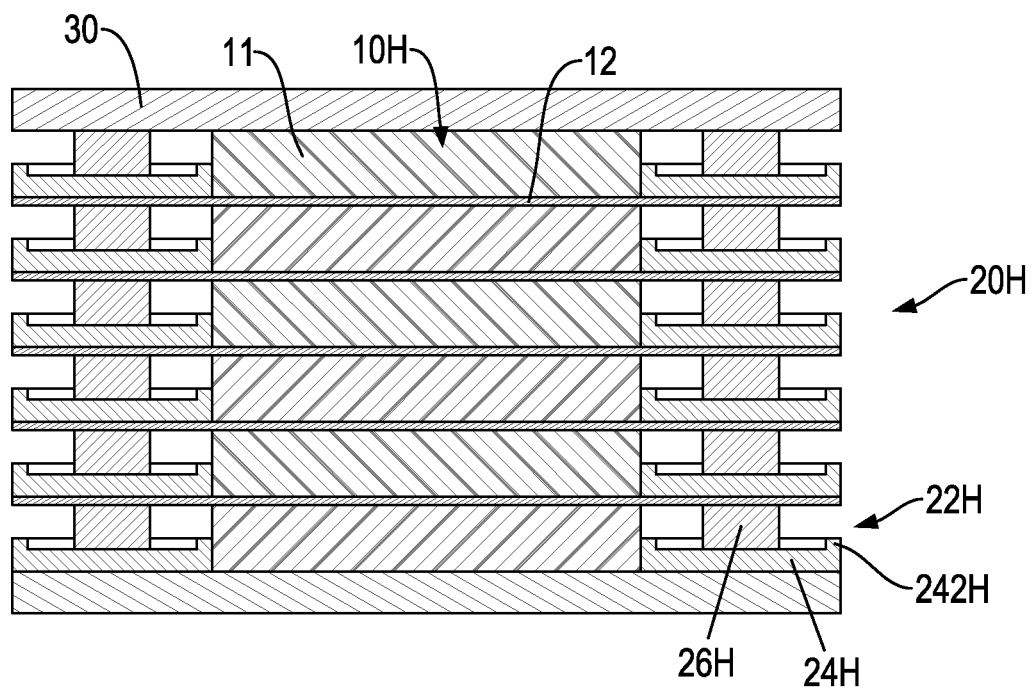
FIG. 17 is a cross sectional front view of a twelfth embodiment of a friction-damping energy absorber in accordance with the present invention.
Figure 18:
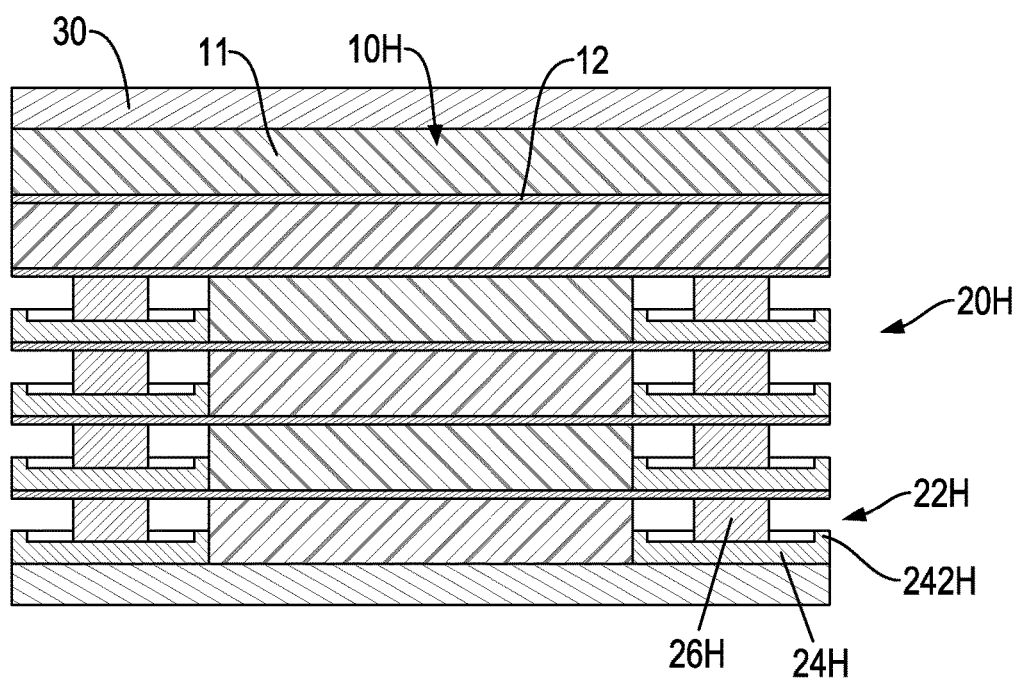
FIG. 18 is a cross sectional front view of a thirteenth embodiment of a friction-damping energy absorber in accordance with the present invention.
Figure 19:
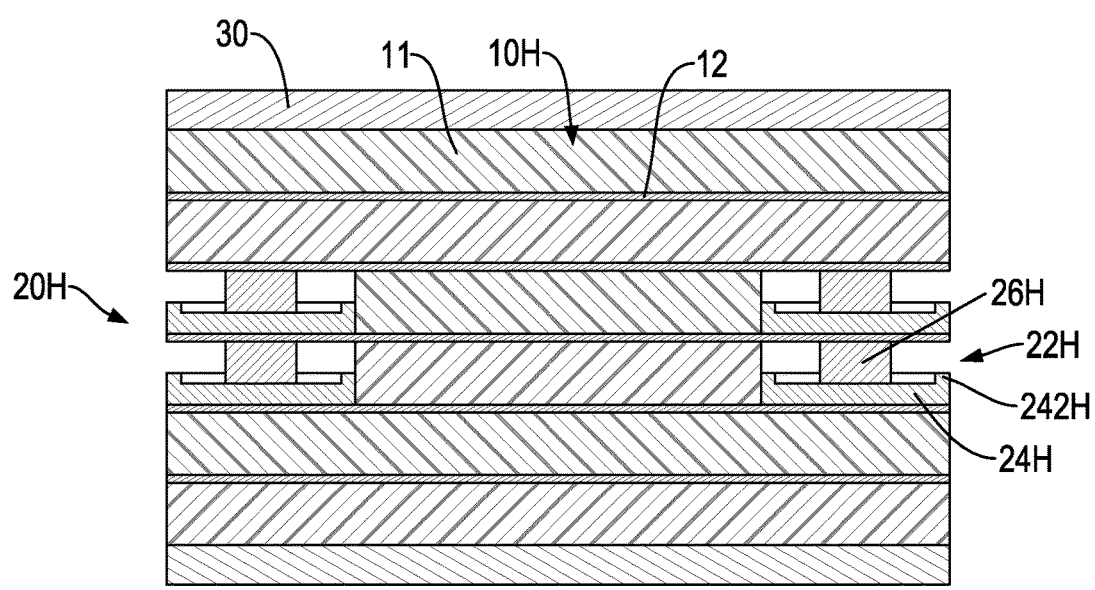
FIG. 19 is a cross sectional front view of a fourteenth embodiment of a friction-damping energy absorber in accordance with the present invention.

With reference to FIGS. 17 to 19, in the twelfth to fourteenth embodiment, at least one of the at least one sliding unit 22H of the sliding sleeve 20H is a sliding assembly. Each sliding assembly comprises one sliding cover 24H and one sliding block 26H being slidable relative to the sliding cover 24H. The sliding cover 24H and the sliding block 26H are respectively adjacent to two of the material layers 12.

Figure 20:
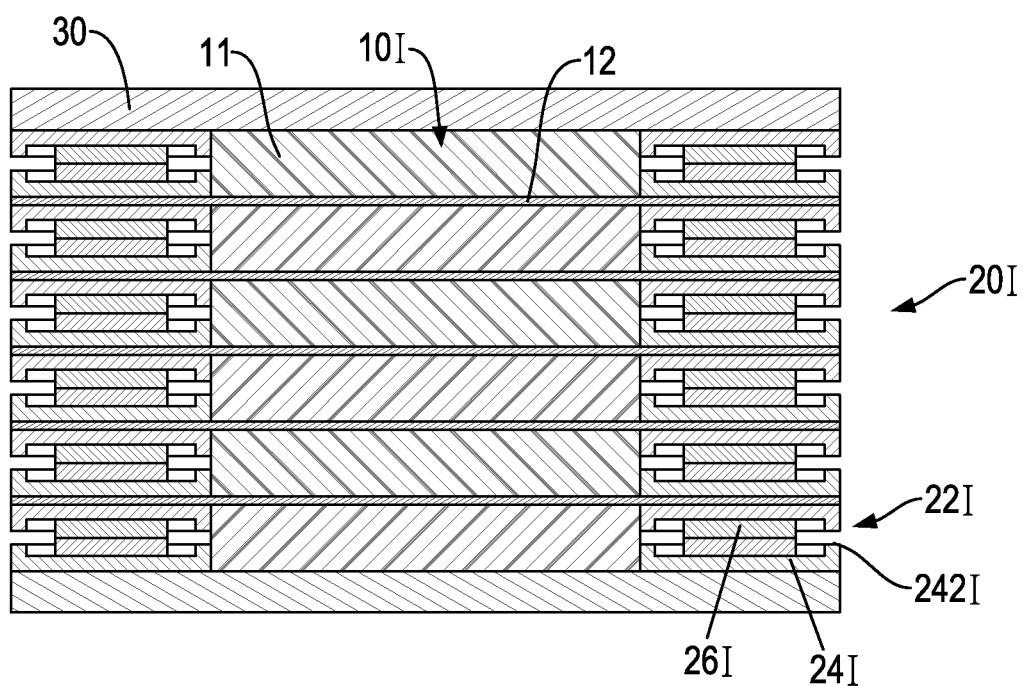
FIG. 20 is a cross sectional front view of a fifteenth embodiment of a friction-damping energy absorber in accordance with the present invention.
Figure 21:
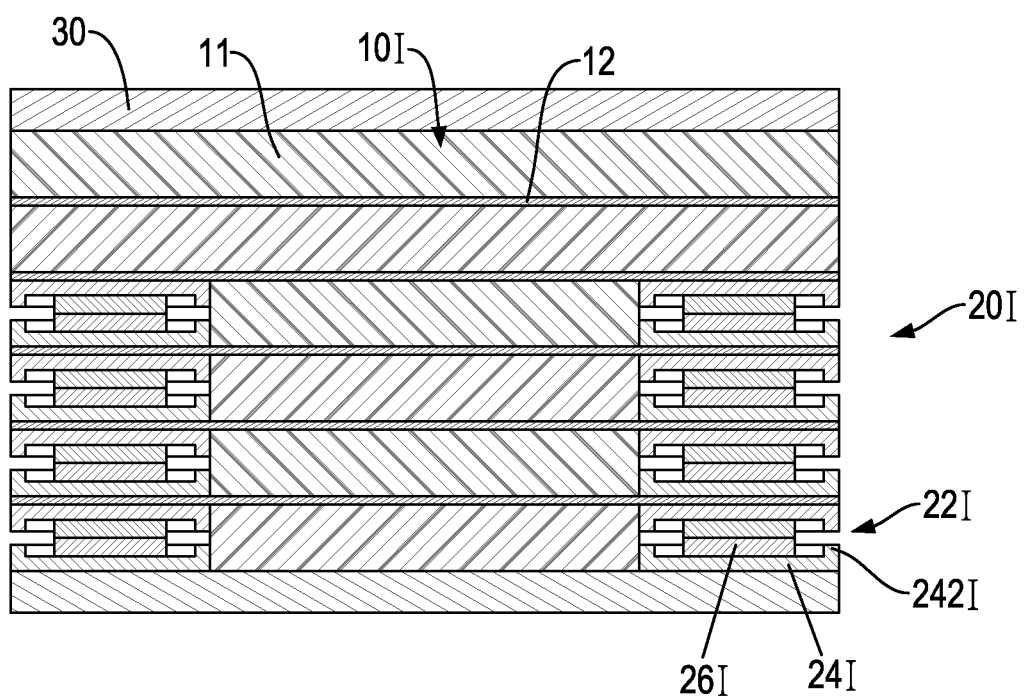
FIG. 21 is a cross sectional front view of a sixteenth embodiment of a friction-damping energy absorber in accordance with the present invention.
Figure 22:
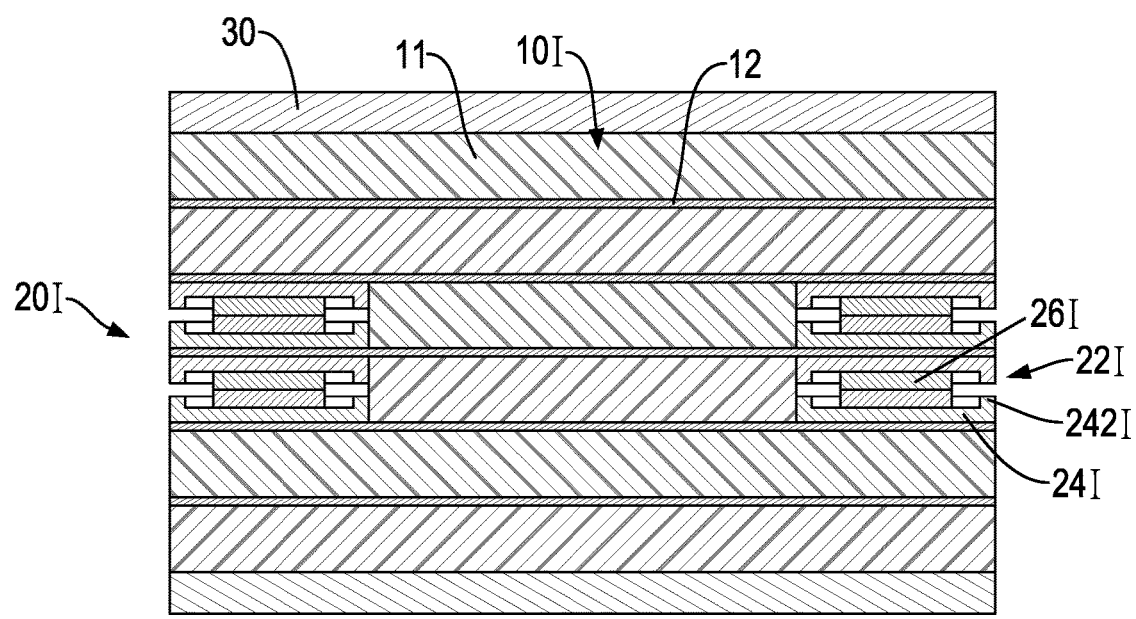
FIG. 22 is a cross sectional front view of a seventeenth embodiment of a friction-damping energy absorber in accordance with the present invention.

With reference to FIGS. 20 to 22, in the fifteenth to seventeenth embodiment, at least one of the at least one sliding unit 22I of the sliding sleeve 20I is a sliding assembly. Each sliding assembly comprises two sliding covers 24I and at least two sliding blocks 26I stacked each other and slidably mounted between the two sliding covers 24I. Each sliding cover 24I has a limiting flange 2421 formed on the sliding cover 24I at a side facing the sliding blocks 26I and mounted around the sliding blocks 26I to limit the sliding ranges of the sliding blocks 26I. Furthermore, in the fifteenth to seventeenth embodiment, at least one of the at least one sliding unit 22I of the sliding sleeve 20I is mounted between two adjacent second material layers 12.

Figure 23:
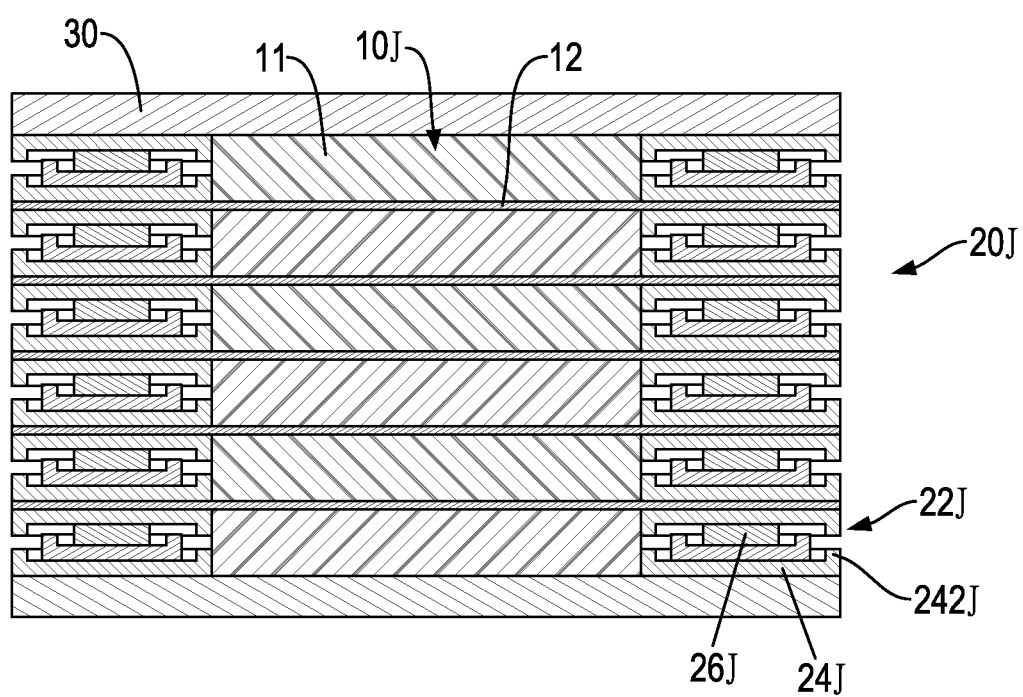
FIG. 23 is a cross sectional front view of an eighteenth embodiment of a friction-damping energy absorber in accordance with the present invention.
Figure 24:
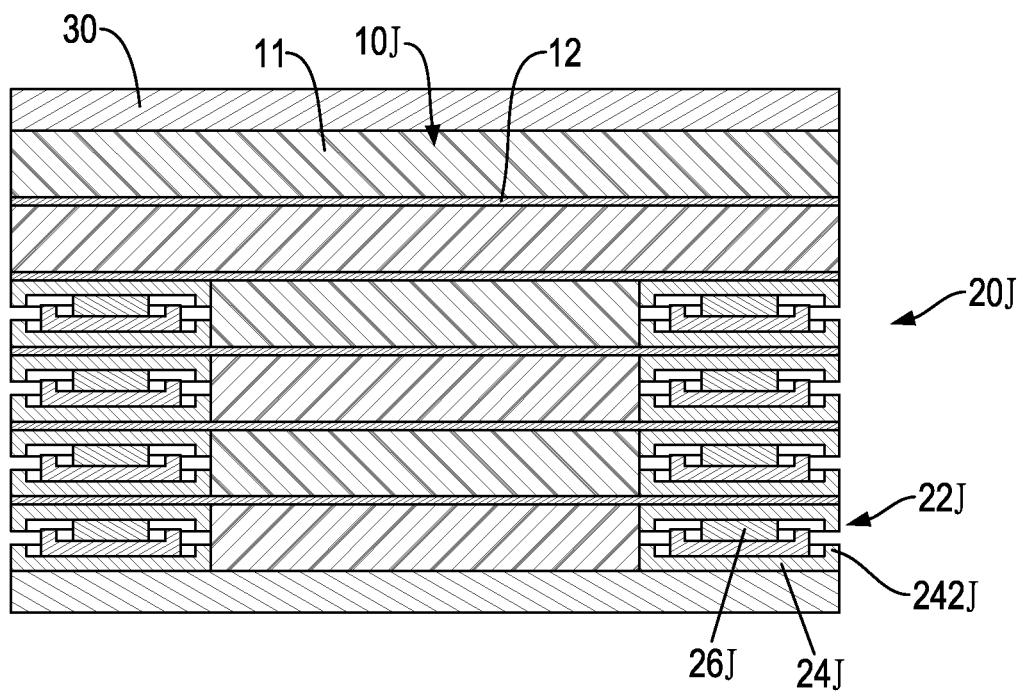
FIG. 24 is a cross sectional front view of a nineteenth embodiment of a friction-damping energy absorber in accordance with the present invention.
Figure 25:
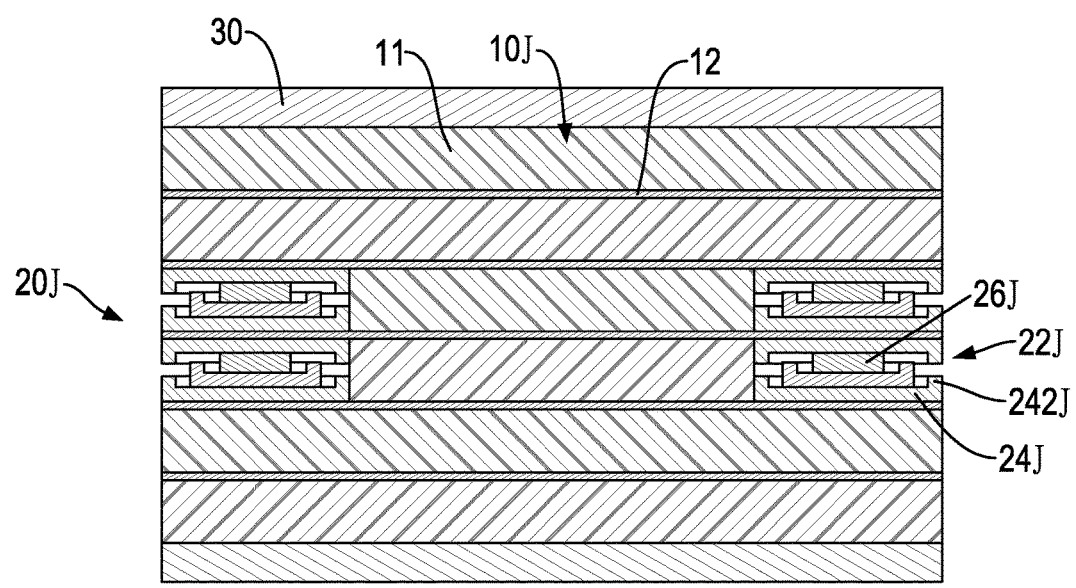
FIG. 25 is a cross sectional front view of a twentieth embodiment of a friction-damping energy absorber in accordance with the present invention.

With reference to FIGS. 23 to 25, in the eighteenth to twentieth embodiment, at least one of the at least one sliding unit 22J of the sliding sleeve 20J is a sliding assembly. Each sliding assembly comprises three sliding covers 24J and a sliding block 26J having two side faces. Two of the three sliding covers 24J of are stacked with each other and are located at one of the side faces of the sliding block 26J, and the other sliding cover 24J is located at the other side face of the sliding block 26J. Each sliding cover 24J has a limiting flange 242J formed on the sliding cover 24J at a side facing the sliding block 26J and mounted around the sliding block 26J to limit the sliding range of the sliding block 26J. Preferably, the two stacked sliding covers 24J may be located above the sliding block 26J, and the other sliding cover 24J is located below the sliding block 26J. The limiting flange 242J on each sliding cover 24J is formed on the sliding cover 24J at a side facing the sliding block 26J and has the same function as each other. In other words, the two stacked sliding covers 24J are located at one of the side faces of the sliding block 26J, and the other sliding cover 24J is located at the other side face of the sliding block 26J. Each sliding cover 24J has a limiting flange 242J formed on the sliding cover 24J at a side facing the sliding block 26J.

Figure 26:
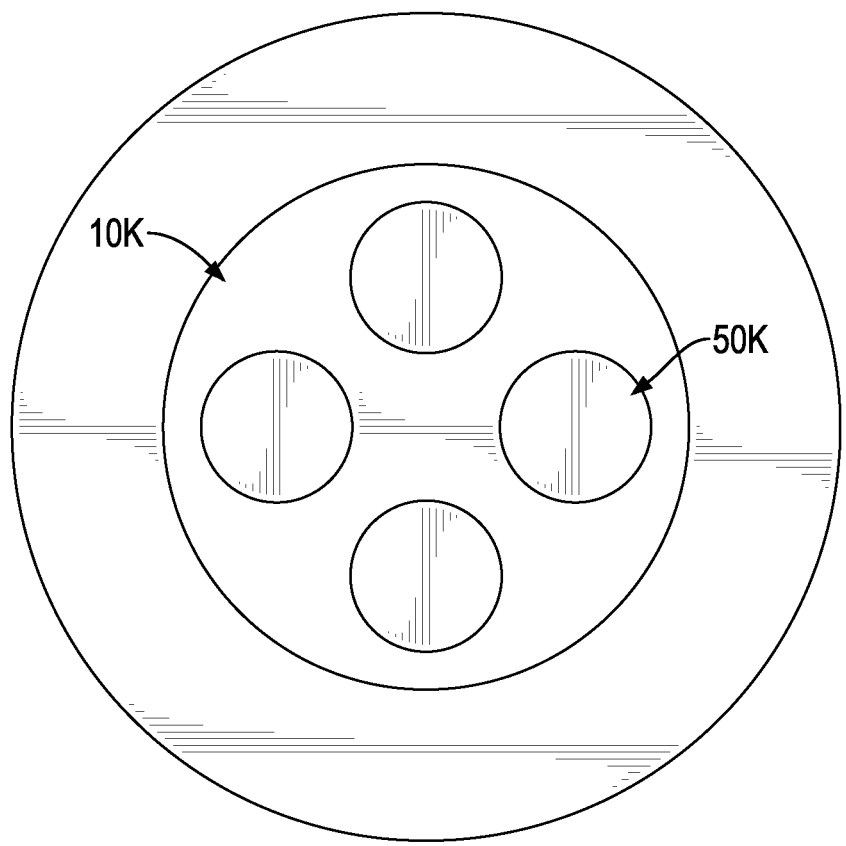
FIG. 26 is a cross sectional top view of a twenty-first embodiment of a friction-damping energy absorber in accordance with the present invention.

With reference to FIG. 26, each one of the at least one sliding post 10K further comprises at least one core post 50K mounted in the sliding post 10K. In the twenty-first embodiment as shown in FIG. 26, four core posts 50K are implemented. Each core post 50K is composed of at least one sliding unit 22 to 22J as shown in FIGS. 1 to 25 to fit with different use demand. In addition, the different sliding units 22 to 22J shown in FIGS. 1 to 25 can be applied in a core post 50K or in different core posts 50K in any possible combinations.

Figure 27:
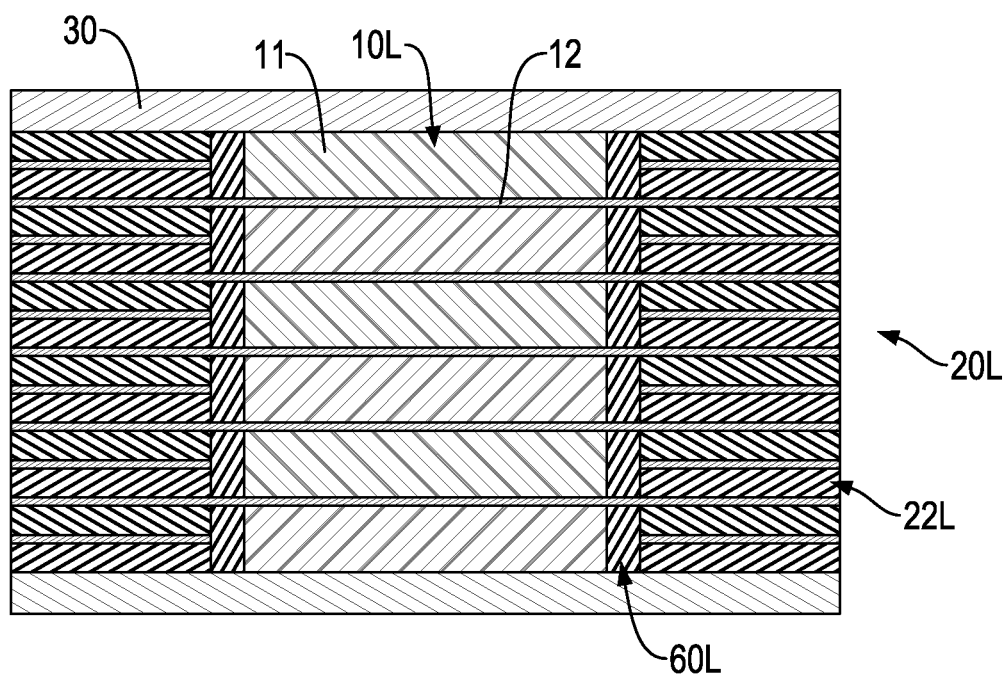
FIG. 27 is a cross sectional front view of a twenty-second embodiment of a friction-damping energy absorber in accordance with the present invention.

With reference to FIG. 27, in the twenty-second embodiment, a supporting unit 60L is arranged between the at least one sliding post 10L and the sliding sleeve 20L to provide a supporting effect and a deformation space to the sliding units 22L of the sliding sleeve 20L. Accordingly, the structural strength and the shock-absorbing effect of the friction-damping energy absorber can be improved.

Figure 28:
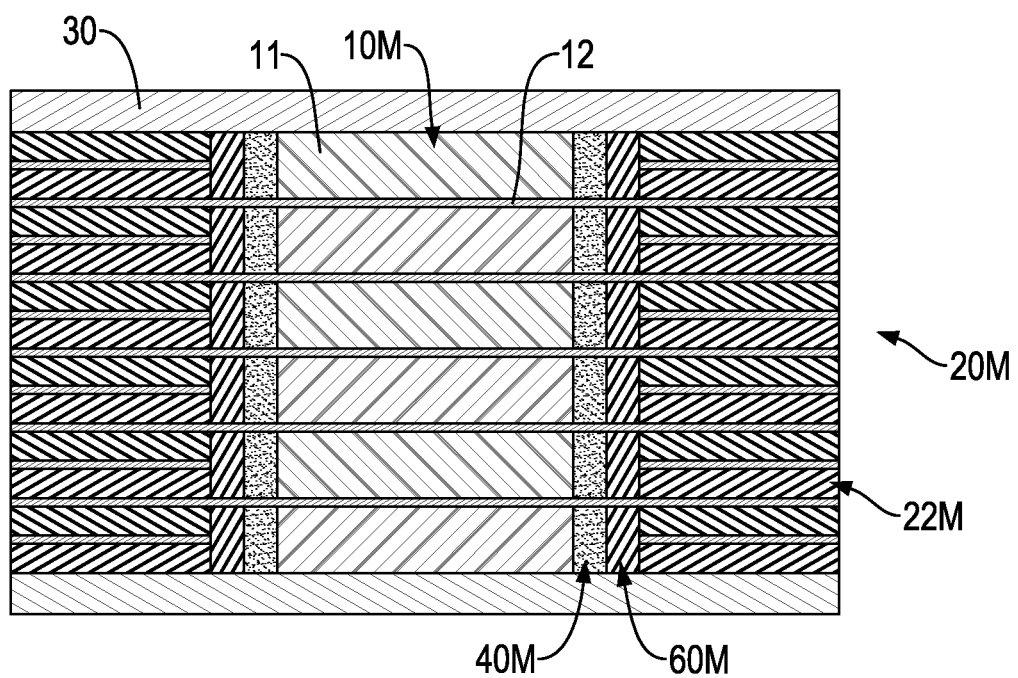
FIG. 28 is a cross sectional front view of a twenty-third embodiment of a friction-damping energy absorber in accordance with the present invention.

With reference to FIG. 28, in the twenty-third embodiment, a supporting unit 60M is arranged between the at least one sliding post 10M and the sliding sleeve 20M, and a cooling unit 40M is mounted between the supporting unit 60M and the at least one sliding post 10M. Each cooling unit 40M comprises a sealed tube and coolant filled in the sealed tube. The sealed tube is hollow and is mounted around the sliding post 10M, the coolant is filled in the sealed tube. Accordingly, the temperature of the friction-damping energy absorber can be effectively reduced to prevent the first and second material layers 11, 12 and the sliding sleeve 20M from being damaged or melted due to high temperature. In addition, the supporting unit 60M can provide a supporting effect and a deformation space to the sliding units 22M of the sliding sleeve 20M. Accordingly, the structural strength and the shock-absorbing effect of the friction-damping energy absorber can be improved.

Figure 29:
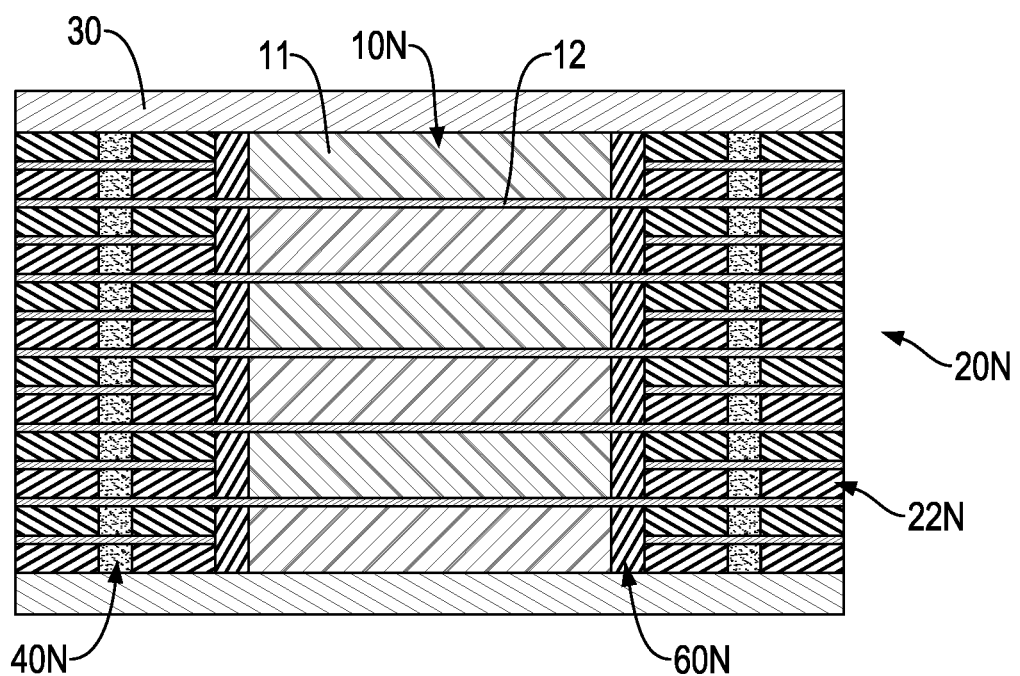
FIG. 29 is a cross sectional front view of a twenty-fourth embodiment of a friction-damping energy absorber in accordance with the present invention.

With reference to FIG. 29, in the twenty-fourth embodiment, a supporting unit 60N is arranged between the at least one sliding post 10N and the sliding sleeve 20N, and a cooling unit 40N is mounted in the sliding sleeve 20N. Each cooling unit 40N comprises a sealed tube and coolant filled in the sealed tube. The sealed tube is hollow and annular and is mounted in the sliding sleeve 20N, and the coolant is filled in the sealed tube. Accordingly, the temperature of the sliding sleeve 20N and the whole friction-damping energy absorber can be effectively reduced to prevent the first and second material layers 11, 12 and the sliding sleeve 20N from being damaged or melted due to high temperature. In addition, the supporting unit 60N can provide a supporting effect and a deformation space to the sliding units 22N of the sliding sleeve 20N. Accordingly, the structural strength and the shock-absorbing effect of the friction-damping energy absorber can be improved.

Figure 30:
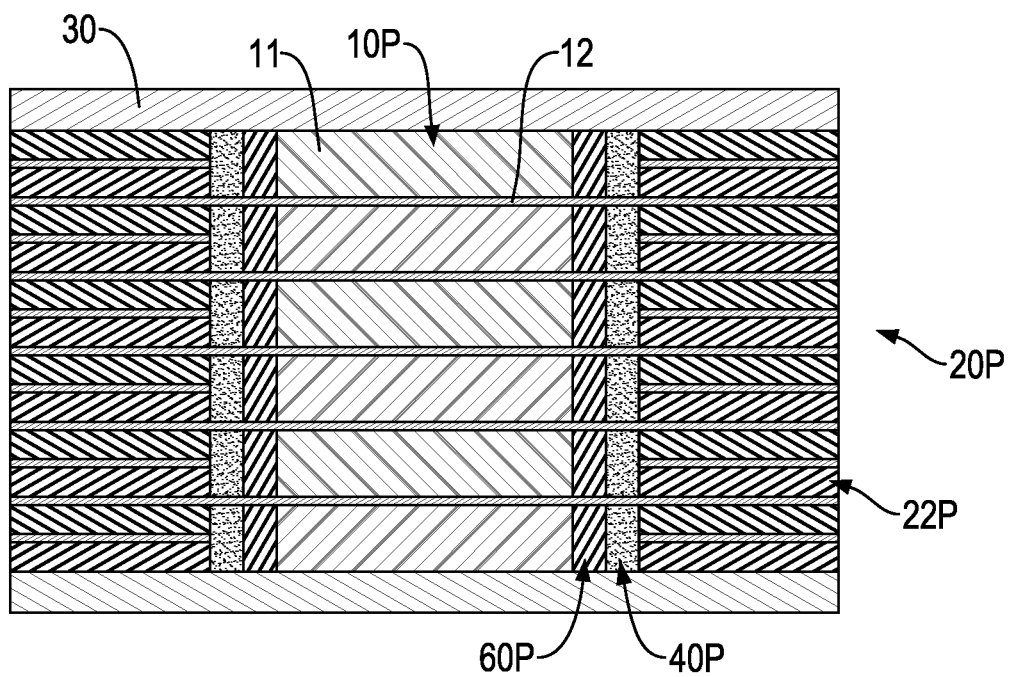
FIG. 30 is a cross sectional front view of a twenty-fifth embodiment of a friction-damping energy absorber in accordance with the present invention.

With reference to FIG. 30, in the twenty-fifth embodiment, a cooling unit 40P is arranged between the at least one sliding post 10P and the sliding sleeve 20P, and a supporting unit 60P is mounted between the cooling unit 40P and the at least one sliding post 10P. Each cooling unit 40P comprises a sealed tube and coolant filled in the sealed tube. The sealed tube is hollow and is mounted around the supporting unit 60P, and the coolant is filled in the sealed tube. Accordingly, the temperature of the at least one sliding post 10P and the whole friction-damping energy absorber can be effectively reduced to prevent the first and second material layers 11,12 and the sliding sleeve 20P from being damaged or melted due to high temperature. In addition, the supporting unit 60P can provide a supporting effect and a deformation space to the sliding units 22P of the sliding sleeve 20P. Accordingly, the structural strength and the shock-absorbing effect of the friction-damping energy absorber can be improved.

Figure 31:
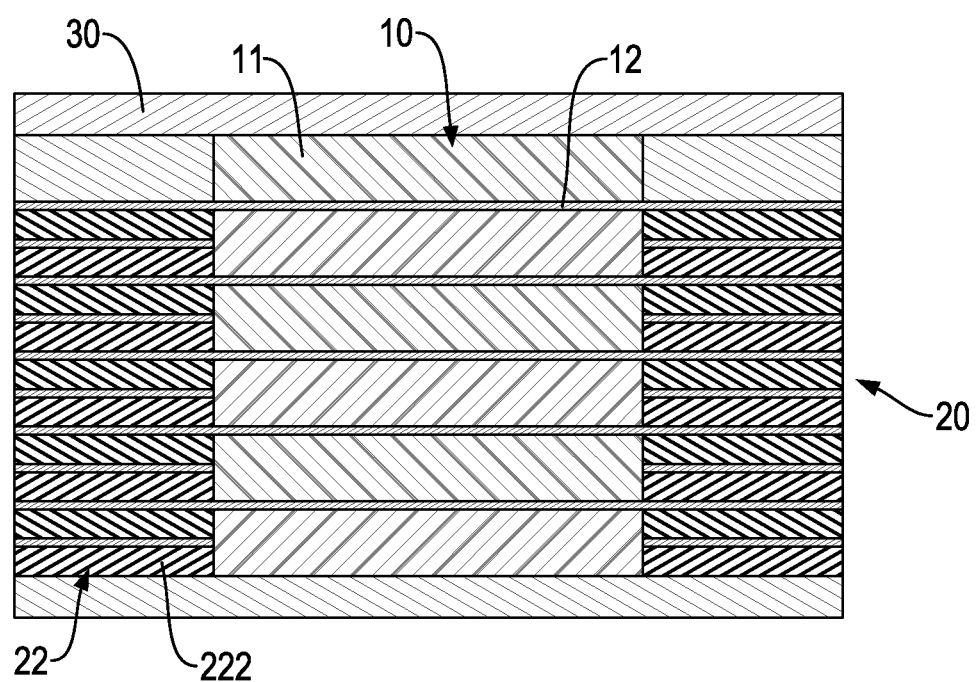
FIG. 31 is a cross sectional front view of a twenty-sixth embodiment of a friction-damping energy absorber in accordance with the present invention.

With reference to FIG. 31, in the twenty-sixth embodiment, one of the at least one sliding unit 22 of each one of the sliding sleeve 20 is composed of a single sliding sheet 222.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A friction-damping energy absorber comprising:
   at least one sliding post, and each one of the at least one sliding post composed of multiple first material layers and multiple second material layers arranged in an alternate manner;

a sliding sleeve mounted around at least one part of the at least one sliding post and composed of multiple sliding units;
wherein at least one of the sliding units of the sliding sleeve is mounted between at least two adjacent ones of the second material layers.

2. The friction-damping energy absorber as claimed in claim 1, wherein the sliding sleeve is mounted around a whole length of the at least one sliding post.

3. The friction-damping energy absorber as claimed in claim 1, wherein at least one of the sliding units of the sliding sleeve is composed of multiple sliding sheets.

4. The friction-damping energy absorber as claimed in claim 3 further comprising a cooling unit arranged between the at least one sliding post and the sliding sleeve.

5. The friction-damping energy absorber as claimed in claim 3, wherein the sliding sleeve further comprises a cooling unit mounted in the sliding sleeve.

6. The friction-damping energy absorber as claimed in claim 3 further comprising a supporting unit arranged between the at least one sliding post and the sliding sleeve.

7. The friction-damping energy absorber as claimed in claim 3, wherein each one of the at least one sliding post further comprises at least one core post mounted in the sliding post and respectively composed of at least one sliding unit.

8. The friction-damping energy absorber as claimed in claim 1, wherein at least one of the sliding units of the sliding sleeve is a sliding assembly.

9. The friction-damping energy absorber as claimed in claim 8, wherein
each one of the at least one sliding assembly comprises two sliding covers and at least one sliding block slidably mounted between the two sliding covers; and
each sliding cover has a limiting flange formed on the sliding cover at a side facing the at least one sliding block and mounted around the at least one sliding block.

10. The friction-damping energy absorber as claimed in claim 9, wherein the at least one sliding block is implemented as one in amount in each one of the at least one sliding assembly.

11. The friction-damping energy absorber as claimed in claim 10, wherein the sliding block of each one of the at least one sliding assembly is integrally formed on one of the sliding covers of the sliding assembly.

12. The friction-damping energy absorber as claimed in claim 8, wherein each one of the at least one sliding assembly comprises two sliding covers and at least two sliding blocks slidably mounted between the two sliding covers and stacked with each other.

13. The friction-damping energy absorber as claimed in claim 8, wherein each one of the at least one sliding assembly comprises at least three sliding covers and at least one sliding block having two side faces;
two of the at least three sliding covers of each one of the at least one sliding assembly are stacked with each other and are located at one of the side faces of the at least one sliding block of the sliding assembly, and the other one of the at least three sliding covers of the sliding assembly is located at the other side face of the at least one sliding block of the sliding assembly; and
each sliding cover of each one of the at least one sliding assembly has a limiting flange formed on the sliding cover at a side facing the at least one sliding block of the sliding assembly and mounted around the at least one sliding block of the sliding assembly.

14. The friction-damping energy absorber as claimed in claim 8, wherein each one of the at least one sliding assembly comprises one sliding cover and one sliding block;
the sliding cover of each one of the at least one sliding assembly has a limiting flange formed on the sliding cover at a side facing the sliding block of the sliding assembly and mounted around the sliding block of the sliding assembly.

15. The friction-damping energy absorber as claimed in claim 8 further comprising a cooling unit arranged between the at least one sliding post and the sliding sleeve.

16. The friction-damping energy absorber as claimed in claim 8, wherein the sliding sleeve further comprises a cooling unit mounted in the sliding sleeve.

17. The friction-damping energy absorber as claimed in claim 8 further comprising a supporting unit arranged between the at least one sliding post and the sliding sleeve.

18. The friction-damping energy absorber as claimed in claim 8, wherein each one of the at least one sliding post further comprises at least one core post mounted in the sliding post and respectively composed of at least one sliding unit.

19. The friction-damping energy absorber as claimed in claim 1 further comprising a cooling unit arranged between the at least one sliding post and the sliding sleeve.

20. The friction-damping energy absorber as claimed in claim 1, wherein the sliding sleeve further has a cooling unit mounted in the sliding sleeve.

21. The friction-damping energy absorber as claimed in claim 1 further comprising a supporting unit arranged between the at least one sliding post and the sliding sleeve.

22. The friction-damping energy absorber as claimed in claim 21 further comprising a cooling unit arranged between the at least one sliding post and the supporting unit.

23. The friction-damping energy absorber as claimed in claim 21 further comprising a cooling unit arranged between the sliding sleeve and the supporting unit.

24. The friction-damping energy absorber as claimed in claim 21, wherein the sliding unit further has a cooling unit mounted in the sliding sleeve.

25. The friction-damping energy absorber as claimed in claim 1, wherein each one of the at least one sliding post further comprises at least one core post mounted in the sliding post and respectively composed of at least one sliding unit.

26. The friction-damping energy absorber as claimed in claim 1, wherein at least one of the sliding units of the sliding sleeve is composed of at least one sliding sheet.

27. The friction-damping energy absorber as claimed in claim 26 further comprising a cooling unit arranged between the at least one sliding post and the sliding sleeve.

28. The friction-damping energy absorber as claimed in claim 26, wherein the sliding sleeve further comprises a cooling unit mounted in the sliding sleeve.

29. The friction-damping energy absorber as claimed in claim 26 further comprising a supporting unit arranged between the at least one sliding post and the sliding sleeve.

30. The friction-damping energy absorber as claimed in claim 26, wherein each one of the at least one sliding post further comprises at least one core post mounted in the sliding post and respectively composed of at least one sliding unit.

31. The friction-damping energy absorber as claimed in claim 1, wherein each sliding unit of the sliding sleeve forms a vertical stiffness to share a vertical load of the friction-damping energy absorber to adjust friction of the sliding units of the sliding sleeve.

32. The friction-damping energy absorber as claimed in claim 1, wherein at least one of the sliding units of the sliding sleeve forms a vertical stiffness to share a vertical load of the friction-damping energy absorber to adjust friction of the sliding unit of the sliding sleeve.

33. The friction-damping energy absorber as claimed in claim 1 further comprising two supporting boards disposed on two ends of the at least one sliding post.

34. A friction-damping energy absorber comprising:
- at least one sliding post and each one of the at least one sliding post composed of multiple first material layers and multiple second material layers arranged in an alternate manner;
- a sliding sleeve mounted around at least one part of the at least one sliding post and composed of multiple sliding units;
- wherein the sliding sleeve has a length shorter than a length of the at least one sliding post and is mounted around a lower part of the at least one sliding post;
- the at least one sliding post has an upper part that is free from being mounted around the sliding sleeve and has a section area larger than a section area of the lower part of the at least one sliding post; and
- the upper part of the at least one sliding post covers over the sliding sleeve.

35. The friction-damping energy absorber as claimed in claim 34 further comprising two supporting boards disposed on two ends of the at least one sliding post.

36. A friction-damping energy absorber comprising:
- at least one sliding post, and each one of the at least one sliding post composed of multiple first material layers and multiple second material layers arranged in an alternate manner;
- a sliding sleeve mounted around at least one part of the at least one sliding post and composed of multiple sliding units;
- wherein the sliding sleeve has a length shorter than a length of the at least one sliding post and is mounted around an upper part of the at least one sliding post;
- the at least one sliding post has a lower part that is free from being mounted around the sliding sleeve and has a section area larger than a section area of the upper part of the at least one sliding post; and
- the lower part of the at least one sliding post extends over the sliding sleeve.

37. The friction-damping energy absorber as claimed in claim 36 further comprising two supporting boards disposed on two ends of the at least one sliding post.

38. A friction-damping energy absorber comprising:
- at least one sliding post, and each one of the at least one sliding post composed of multiple first material layers and multiple second material layers arranged in an alternate manner;
- a sliding sleeve mounted around at least one part of the at least one sliding post and composed of multiple sliding units;
- wherein the sliding sleeve has a length shorter than a length of the at least one sliding post and is mounted around a middle part of the at least one sliding post;
- the at least one sliding post has an upper part and a lower part that are free from being mounted around the sliding sleeve and respectively have a section area larger than a section area of the middle part of the at least one sliding post;
- the upper part of the at least one sliding post covers over the sliding sleeve; and
- the lower part of the at least one sliding post extends over the sliding sleeve.

39. The friction-damping energy absorber as claimed in claim 38 further comprising two supporting boards disposed on two ends of the at least one sliding post.

40. A friction-damping energy absorber comprising:
- at least one sliding post, and each one of the at least one sliding post composed of multiple first material layers and multiple second material layers arranged in an alternate manner;
- a sliding sleeve mounted around at least one part of the at least one sliding post and composed of multiple sliding units;
- wherein each sliding unit of the sliding sleeve is mounted between two adjacent ones of the second material layers.

41. The friction-damping energy absorber as claimed in claim 40 further comprising two supporting boards disposed on two ends of the at least one sliding post.

42. A friction-damping energy absorber comprising:
- at least one sliding post, and each one of the at least one sliding post composed of multiple first material layers and multiple second material layers arranged in an alternate manner;
- a sliding sleeve mounted around at least one part of the at least one sliding post and composed of multiple sliding units, wherein at least one of the sliding units of the sliding sleeve is mounted between two adjacent ones of the second material layers.

43. The friction-damping energy absorber as claimed in claim 42, wherein the sliding sleeve is mounted around a whole length of the at least one sliding post.

44. The friction-damping energy absorber as claimed in claim 42, wherein at least one of the sliding units of the sliding sleeve is composed of multiple sliding sheets.

45. The friction-damping energy absorber as claimed in claim 42, wherein at least one of the sliding units of the sliding sleeve is a sliding assembly.

46. The friction-damping energy absorber as claimed in claim 42 further comprising two supporting boards disposed on two ends of the at least one sliding post.

* * * * *